US005509996A

United States Patent [19]

Assaf

[11] Patent Number: 5,509,996

[45] Date of Patent: Apr. 23, 1996

[54] METHOD OF EVAPORATING AND COOLING LIQUID

[75] Inventor: Gad Assaf, Rehovot, Israel

[73] Assignee: Geophysical Engineering Company, Seattle, Wash.

[21] Appl. No.: 711,403

[22] Filed: Jun. 5, 1991

Related U.S. Application Data

[63] Continuation of Ser. No. 376,035, Jul. 6, 1989, abandoned.

[30] Foreign Application Priority Data

Jul. 12, 1988 [IL] Israel .......... 87088

[51] Int. Cl.$^6$ .......... B01D 1/14; B01D 1/16

[52] U.S. Cl. .......... 159/48.2; 159/4.01; 159/DIG. 23; 159/DIG. 40; 203/10; 203/49; 203/90; 203/DIG. 17

[58] Field of Search .......... 159/3, 48.2, DIG. 23, 159/DIG. 40, 29, 4.01, 47.3; 203/90, 49, 10, DIG. 17; 202/236; 60/641.11, 641.9; 239/8

[56] References Cited

U.S. PATENT DOCUMENTS

| | | | |
|---|---|---|---|
| 3,758,651 | 9/1973 | Kaspar | 264/167 |
| 3,895,090 | 7/1975 | Kobayashi et al. | 264/211.12 |
| 4,089,120 | 5/1978 | Kozischek | 159/DIG. 27 |
| 4,370,860 | 2/1983 | Assaf | 60/641.11 |
| 4,464,309 | 8/1984 | Linhardt | 60/641.11 |
| 4,704,189 | 11/1987 | Assaf | 159/48.2 |
| 4,742,682 | 5/1988 | Assaf et al. | 60/641.11 |

*Primary Examiner*—Virginia Manoharan
*Attorney, Agent, or Firm*—Donald M. Sandler

[57] ABSTRACT

A method for evaporating a starting solution to produce an end solution by spraying the starting solution into a gaseous medium under the conditions that the heat content of the starting solution in contact with the gaseous medium is smaller than the heat content of the gaseous medium; the duration of contact is such that most of the evaporation of solution takes place under conditions of constant enthalpy; and the vapor pressure of the gaseous medium is less than the vapor pressure of the liquid/gas interface of the end solution including the step of spraying the starting solution supplied by delivering devices using a pump through spray heads, each spray head includes a member having a plurality of holes the radii of which are not less than 0.025 mm and the distance between them is at least 0.3 mm for producing a shower of starting solution droplets of substantially constant radius substantially independent of spray head operating pressure. An apparatus for evaporating a starting solution is also provided.

20 Claims, 2 Drawing Sheets

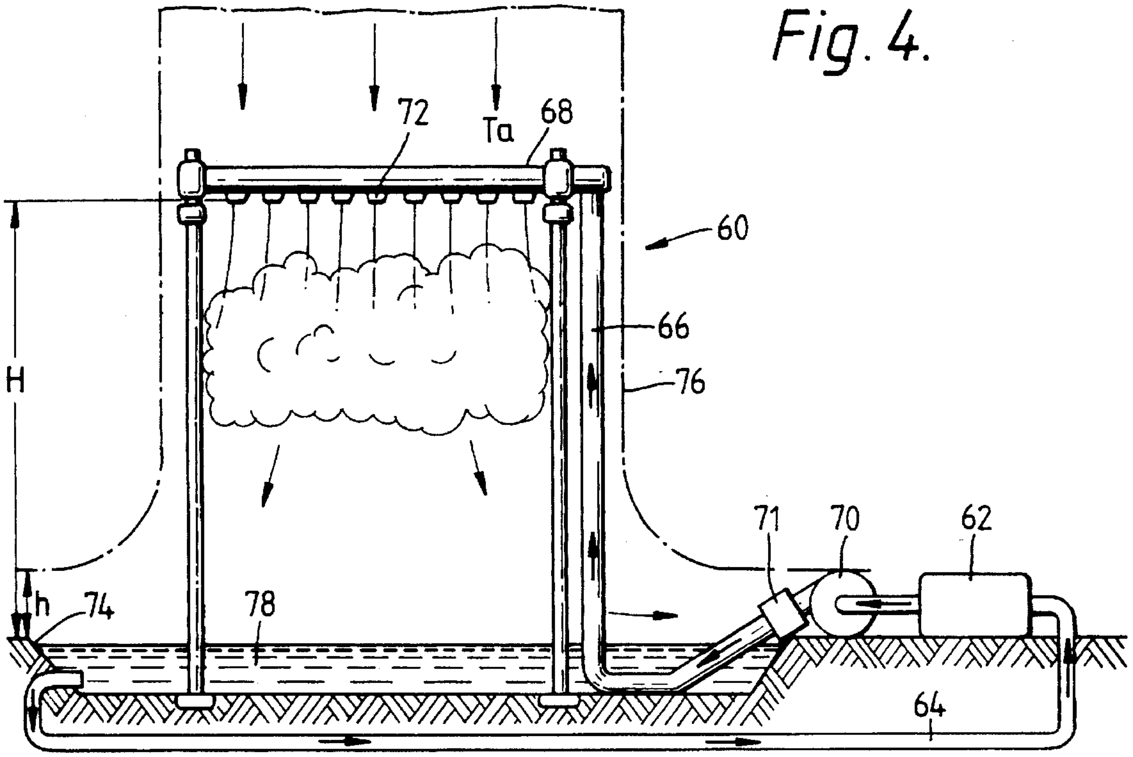
Fig. 4.
Fig. 5.
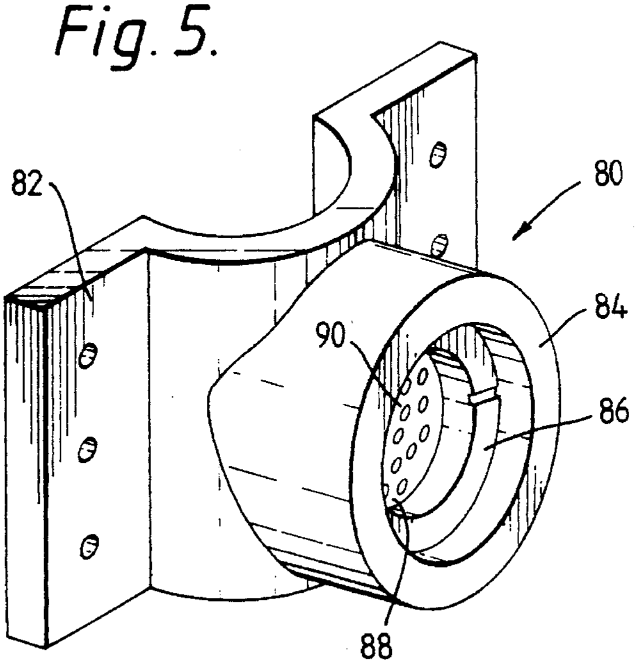

METHOD OF EVAPORATING AND COOLING LIQUID

This application is a continuation of application No. 07/376,035, filed Jul. 6, 1989, now abandoned.

TECHNICAL FIELD

This application relates to a method of and apparatus for exchanging heat between a liquid and a gaseous medium and more particularly is concerned with a method of and apparatus for evaporating and cooling a liquid.

BACKGROUND OF THE INVENTION

When evaporating or cooling a liquid or solution in a gaseous medium, the manner in which contact is made between the liquid and gas has been found to play prime importance in determining the efficiency of the processes. Conventionally, evaporating ponds containing a liquid have been used for many years to evaporate liquid or concentrate a solution, with solar radiation being used as the energy source of evaporation and the liquid evaporated being released in the form of vapors to the free atmosphere. This has been common practice in many industrial and agricultural processes used in industries such as the salt producing, industrial waste disposal, mineral recovery and potash producing industries. In such methods and devices, however, the contact between the liquid being evaporated and the gaseous medium into which vapors are released and the exposure of the liquid to the energy source is minimal since only the upper surface of the liquid present in the pond is exposed to the ambient air.

For example, when minerals are recovered using large-scale evaporating ponds, solar radiation absorbed by these ponds supplies latent heat of evaporation permitting the solution to become progressively concentrated. However, since the vapor pressure of the solution or brine, being small in comparison with fresh water at the same temperature, decreases with increasing concentration, evaporation is retarded as the solution concentration increases. Furthermore, as the temperature of the solution rises, the sensible and long-wave radiation flux from the pond increases to a level where it exceeds the latent heat flux that produces evaporation and brine concentration. Consequently, only a fraction of solar energy used in an evaporation pond is converted into useful latent heat flux.

On the other hand, when cooling a liquid, forced draft cooling towers and cooling spray ponds have conventionally been used in industrial processes such as in the condensers of electric power plants, etc. Also natural draft and atmospheric spray cooling towers have been used in several applications. Normally, pressure spray nozzles or nozzles which produce droplets with a spectrum of different droplet sizes are used to produce liquid droplets for exposing the liquid to the gaseous medium. Forced draft cooling towers have been found to consume considerable amounts of energy, mainly due to the fans used to supply air to the cooling towers while spray ponds have been found to suffer from, among other things, inefficient supply of air into the spray body, and a loss of the liquid from the system due to the drift of droplets in winds present to locations external to the spray pond area. Also, due to the fact that the droplets have a spectrum of different droplet sizes, much of the cooling potential or the liquid cannot be efficiently used.

In U.S. Pat. No. 4,704,189 of the present inventor, the disclosure of which is hereby incorporated by reference, a method of and apparatus for evaporating liquid from a solution is disclosed wherein a starting solution is concentrated to a desired end solution without the necessity of using external heat. This is achieved by contacting the starting solution with a gaseous medium under the conditions that the heat content of the starting solution in contact with the gaseous medium is smaller than the heat content of the gaseous medium and the duration of contact is such that most of the evaporation of liquid from the solution takes place under conditions of constant enthalpy. According to this patent, to obtain such conditions, the starting solution is exposed to the gaseous medium for a sufficient period of time by either spraying the solution into the gaseous medium using pressure nozzles, rotating discs or piezoelectric sprayers or by passing the gaseous medium through a matrix of filaments over which a thin film of the solution flows. When a spray is used, droplets of a radius not greater than 0.2 mm are preferred, with the spray nozzles being positioned such that the spray travel is in excess of 5 m in order to achieve the desired result. When spraying liquid into the gaseous medium in accordance with this patent, use of spray nozzles which produce droplets of different diameter would be very undesirable, since prevailing winds can cause the drift of many of the relatively small droplets out of the spray area and consequently bring about their loss from the system and the possible contamination of the surrounding environment. Furthermore, use of conventional pressure nozzles for producing the required droplet spray is undesirable since relatively high pressures, conventionally greater than several atmospheres, need to be used, bringing about a relatively high energy consumption and making an operating pressure of several tens of atmospheres necessary merely to double the quantity of liquid used. Also, since the operating pressure of such nozzles influences the size of the droplets produced, flexibility of operation is minimal.

It is therefore an object of the present invention to provide a new and improved method of and apparatus for evaporating and cooling a liquid wherein the disadvantages as outlined are reduced or substantially overcome.

SUMMARY OF THE INVENTION

Accordingly, the present invention comprises a method of and apparatus for exchanging heat between a liquid and a gaseous medium wherein, in one form of the invention, a method and apparatus is provided for evaporating a liquid and in another form of the present invention, a method and apparatus is provided for cooling a liquid, When liquid is evaporated, the liquid or starting solution is sprayed into a gaseous medium under the conditions that the heat content of the starting solution in contact with the gaseous medium is smaller than the heat content of the gaseous medium, the duration of contact of the solution with the gaseous medium in the droplet shower formed by the droplet spray being such that most of the evaporation of liquid from the solution takes place under conditions of constant enthalpy, the vapor pressure of the gaseous medium being less than the vapor pressure of the liquid/gas interface of the end solution. In the present invention, these conditions are achieved by spraying the starting solution through preferably several spray heads which ensure that the size of the droplets from which liquid is evaporated is substantially uniform or constant, a droplet radius being used which, on the one hand, is sufficiently small to permit almost all of the starting solution droplets to evaporate under conditions of constant enthalpy wherein almost all of the energy for evaporation is extracted from the gaseous medium surrounding the droplets, while, on the other hand, being sufficiently large to substantially reduce or eliminate droplet drift away from the spray area, particularly important when the evaporating process is carried out in natural environments such as in the open air, The spray heads used to produce the shower of starting solution droplets comprise a member having a plurality of holes the radii of which are preferably not less than 0.025 mm and the distance between the holes, preferably at least 0.3 mm, being such to ensure the production of droplets of uniform or constant size in the gaseous medium, the spray heads operating at low pressures such that the pressure used for delivering the starting solution to the spray heads using flow control means is minimized, consequently minimizing energy consumption. In the present invention, the droplet size is substantially independent of spray head operating pressure. Preferably, a spray head operating pressure of less than three atmospheres is used. In accordance with the present invention, the spray heads are positioned in order to ensure that the mixing ratio in the droplet shower of the liquid to gas, measured in terms of kilograms of liquid per kilogram of gas, is substantially constant throughout the droplet shower and preferably less than 0.02. In addition, the droplet radius used is preferably less than the square root of the product of coefficient of salt diffusion of the starting solution, $k_s$, and the interaction time of a droplet in the shower, $t_i$, ensuring that all of the liquid contained in the droplets takes part in the evaporation process. Substantially, all of the liquid mass is contained in droplets having a radius between 0.8 and 1.2 of the nominal droplet radius.

When liquid is to be cooled, the liquid is sprayed into a gaseous medium under the conditions that the heat content of the liquid is larger than the heat content of the air and the mixing ratio m of the liquid to gas, measured in terms of kilograms of liquid per kilogram of gas, if the droplet shower formed is preferably not less than 0.1. According to the present invention, such conditions are achieved by ensuring that the size of the droplets of the liquid to be cooled be substantially uniform or constant wherein the liquid to be cooled is sprayed through preferably spray heads comprising a member having a plurality of holes the radii of which are preferably not less than 0.1 mm and the distance between the holes, preferably at least 0.3 mm, being such to ensure the production of droplets of uniform or constant size in the gaseous medium, the spray heads operating at low pressures such that the pressure used for delivering the liquid to the spray heads using flow control means is minimized, consequently minimizing energy consumption. In the present invention, the droplet size is substantially independent of spray head operating pressure. Preferably, a spray head operating pressure of less than two atmospheres is used. A droplet size is used which is sufficiently large to substantially reduce or eliminate droplet drift away from the spray region, particularly important when the cooling process is carried out in natural environments such as in the open air. Furthermore, the spray heads are positioned such that a substantially constant liquid gas mixing ratio is achieved throughout almost all of the droplet shower. In addition, a droplet radius is used which is preferably less than the square root of the product of coefficient of heat diffusion of the liquid, $k_q$, and the interaction time of a droplet present in the shower, $t_i$, ensuring that almost all of the liquid contained in the droplets takes part in the cooling process and eliminating any need for liquid recycling. Using such dimensions for the spray heads mentioned above, a shower of droplets having a substantially uniform radii of approximately 0.2 mm is produced, Droplets of such uniform radii also minimize possible spread or drift of the spray by ambient winds when the cooling process is carried out in natural environments such as in the open air. Substantially, all of the liquid mass is contained in droplets having a radius between 0.8 and 1.2 of the nominal droplet radius,

BRIEF DESCRIPTION OF THE DRAWINGS

Embodiments of the invention are described below by way of examples, and with reference to the accompanying drawings wherein:

FIG. 4 is a schematic illustration of a further embodiment of the present invention showing the spraying of liquid into air for the purpose of cooling a liquid;

FIG. 5 is a schematic perspective view of an embodiment of a spray head used for spraying liquid into air for cooling liquid in accordance with the present invention.

DESCRIPTION OF THE PREFERRED EMBODIMENTS

Figure 1:
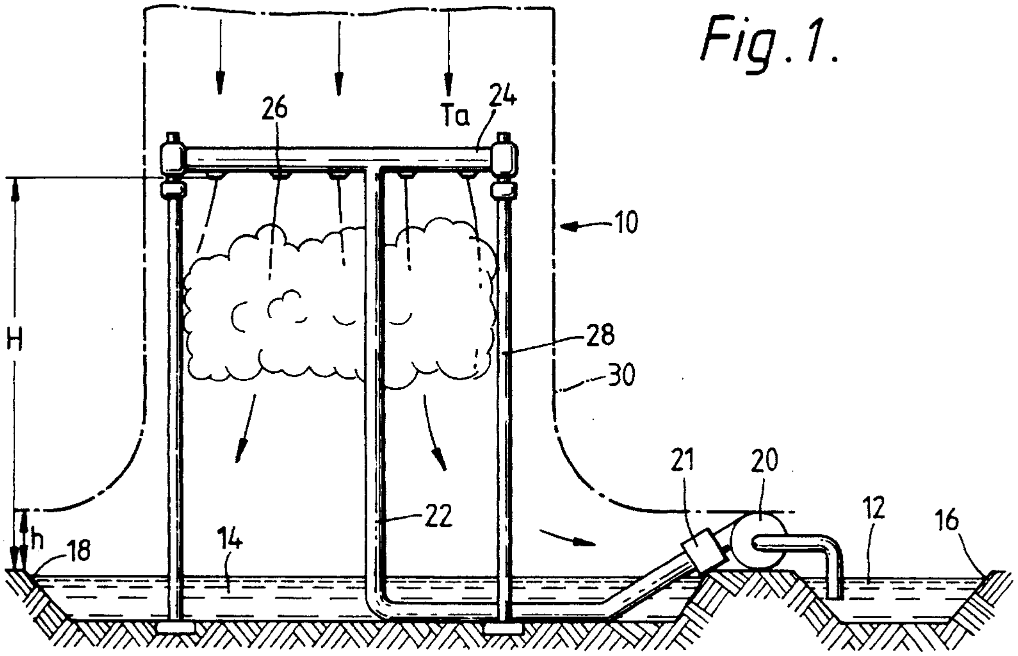
FIG. 1 is a schematic illustration of one embodiment of the present invention showing the spraying of liquid into air for the purpose of evaporating the liquid.

Referring now to FIG. 1 of the drawings, reference numeral 10 designates apparatus, according to the present invention for evaporating liquid, converting starting brine 12 to end brine 14. Apparatus 10 includes a source of starting brine 12 contained in reservoir 16, for example, the sea, and second reservoir 18, which represents a catch basin for receiving the end brine 14. Pump 20 draws brine from reservoir 16 and supplies this brine through a filter 21 for filtering out foreign material from the brine. Mechanical or sand filtration can be used. Having passed through the filter, the brine flows through vertically oriented pipe 22 and horizontally oriented pipe 24, supported by tower plurality 28, to spray heads 26 connected to pipe 24 located at an elevation H above the surface of second reservoir 18. Spray heads 26 are chosen to produce droplets of a predetermined radius as described below, the spray heads being positioned so as to establish a spray shower having a mixing ratio measured in terms of kilograms of liquid per kilogram of air which is less than a predetermined value, as described below. The drag force on the air due to the falling droplets and the increase in the density of the air due to its cooling establish a downwardly flowing column of air 30 into which surrounding ambient air is entrained. As the droplets fall from spray heads 26 into reservoir 18, the density of the brine droplets increases, reaching the predetermined end point as the droplets enter the reservoir. By selecting the basic parameters of the system namely, the mixing ratio, droplet size and the height of the spray heads, the desired end brine will be produced in reservoir 18. However, if necessary, brine in reservoir 18 can be recycled through the spray shower.

While the apparatus shown in FIG. 1 shows the spray heads arranged in order to produce a line shower, spray heads 26 may be arranged, if preferred to produce a cylindrical shower. Normally, a line shower will be preferred when apparatus shown in FIG. 1 is operated in the natural open atmosphere and where the prevailing winds have a preferential direction. In such case, in order to intensify the spray shower produced, several spray lines can be used to advantage in a manner shown in FIG. 2. A plurality of towers 40 is erected in a direction that is normal to the direction of the prevailing wind in order to take advantage of the winds to introduce fresh, dry air into the air thereby enhancing the evaporation and making the shower more effective. Conduits 42 are strung between the towers and the brine to be concentrated is pumped through the conduits to a plurality of spray heads (not shown) through which sprays of dilute brine are introduced into the prevailing wind.

As disclosed in U.S. Pat. No. 4,704,189, in order to ensure that the evaporation process proceeds under conditions of constant enthalpy when the vapors released from the droplets are absorbed by the air as the droplet temperature rises, the temperature of the air decreasing and its humidity increasing, it is recommended that the mixing ratio $m_l$ be less than about 2%, the height of the spray heads be at least 5 m and the radius of the droplets be less than about 0.2 mm. Consequently, as explained in this patent, when brine is concentrated in the open air, sufficient time and space must be provided to ensure that liquid evaporates from the droplets under the prescribed conditions. Since the ambient air is subject to changes in speed and direction, a serious danger exists that droplets may drift away from that catch basin resulting in the loss of brine from the system and possible contamination of the surrounding environment. This is particularly the case when spray heads producing droplets having a rather large size spectrum, such as pressure nozzles, are used, since the small diameter droplets will be particularly liable to drift. Furthermore, the use of such spray heads is inadvisable from a different point of view, in that the large droplets produced therefrom will reach the catch area prior to having given up sufficient vapor in order to reach the required brine concentration. In order to overcome these problems, it is suggested in that patent to expose the brine to the air by presenting the brine to be concentrated as a thin film carried by many filaments, the filaments normally being in the form of a plurality of planar criss-crossed net of thin filaments. However, such a net presents resistance to the air flow, reducing the amount of air reaching the brine and thus lowering the intensity of the evaporation process.

According to the present invention, the apparatus disclosed ensures that most of the evaporation process proceeds under conditions of constant enthalpy with droplet drift away from the catch basin being substantially reduced or almost eliminated without reducing the amount of air entering the evaporation process. This is accomplished by using spray heads 26 which ensure that the size of the droplets exiting the spray heads are substantially uniform or constant. Since the diameter of the droplets produced is substantially constant, a droplet diameter can be selected which, on the one hand is sufficiently small to permit almost all of the brine droplets to evaporate under conditions of constant enthalpy, reaching the required concentration in the catch basin while, on the other hand, being sufficiently large to substantially reduce or eliminate droplet drift away from the catch basin. Normally, the vapor pressure of the gaseous medium into which the droplets are sprayed should have a vapor pressure less than the vapor pressure at the liquid/gas interface of the end solution in order to guarantee the evaporation of liquid. Furthermore, the droplets produced by the spray heads permit the droplets to interact with the gaseous medium such that practically all of the heat and vapor transfers occurring as the vapors are released from the droplets and absorbed by the air take place under the condition that the latent heat flux due to evaporation of the liquid from the droplets is substantially equal to the sensible heat flux due to heating by the gaseous medium whereby the wet-bulb temperature at the liquid/gas interface is substantially constant and equal to the wet-bulb temperature of the gaseous medium. Thus, the evaporation of liquid is vitally dependent on the extent and manner in which the liquid makes contact with the gaseous medium. To this end also, the spray heads are positioned such that the brine-air mixing ratio of the droplet shower is substantially constant throughout the shower, preferably less than 0.02, the dimensions, including the height, H, of the shower being chosen to ensure that the residence time, $t_r$, of the air in the shower volume is greater than $0.1\tau$ and less than $10\tau$, preferably equal to $\tau$, where $\tau$, as defined below in equation (11), is the time constant of the shower system and represents the time required for air temperature change in the shower to reach the thermal head temperature difference, which is the difference between the ambient air temperature and the temperature of the liquid leaving the shower.

Figure 3:
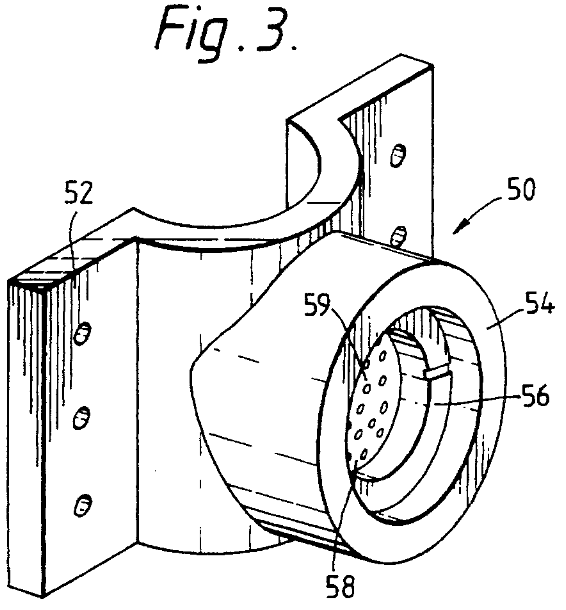
FIG. 3 is a perspective view of an embodiment of a spray head used for spraying liquid into the air for evaporating liquid in accordance with the present invention.

Referring now to FIG. 3, an embodiment of a spray head used in accordance with this aspect of the present invention for evaporating liquid converting starting brine into end brine by spraying starting brine into air is shown wherein spray head 50 comprises connecting member 52 for connecting the spray head to brine supply means as shown in FIG. 1. Pipe section 54 contains fastening ring 56 holding flat-plate member 58 having a plurality of holes 59 for producing a spray of brine droplets of uniform or constant size which interact with the air in a manner described hereinbefore. Since the radius of the droplets produced is substantially constant, a droplet radius can be selected which, on the one hand is sufficiently small to permit almost all of the brine droplets to evaporate under conditions of constant enthalpy, while on the other hand, being sufficiently large to substantially reduce or eliminate droplet drift away from the catch basin. By selecting a droplet radius which is less than the square root of the product of coefficient of salt diffusion, $k_s$, of the starting medium and the interaction time of a droplet, $t_i$, present in the shower as follows:

$$r<[(k_s)(t_i)]^{1/2}$$

it is ensured that all of the liquid contained in the droplet takes part in the evaporation process. In addition, the size of the holes 59 is chosen such that any solid material remaining in the liquid to be evaporated will not cause blockage of the spray heads and the distance between the holes is selected to ensure the production of a spray of liquid droplets having substantially uniform or constant size, Preferably, the radii of holes 59 is not less than about 0.025 mm, and the distance between the holes on member 58 is at least 0.3 mm. Furthermore, spray head 50 operates at minimal pressures, no greater than 3 atmospheres, and its operating pressure has little influence on the size of droplets produced. Preferably, an operating pressure of between 0.2–1.0 atmospheres is used. Consequently, the pump used to supply brine to the spray heads can operate at relatively small pressures and minimize energy consumption, Also flexibility of operation is achieved by using such spray heads since the brine flow rate can be changed when necessary by increasing the spray head operating pressure, without altering the basic characteristics of the spray shower, in particular the droplet radius and mixing ratio. For example, if the ambient wind velocity increases, larger quantities of fresh, dry air are made available for the evaporation process and consequently the brine flow rate can be increased by increasing the spray head operating pressure permitting larger quantities of brine to be concentrated while at the same time maintaining a constant droplet radius. While the embodiment shown in FIG. 3 shows member 58 as a flat sheet of material, other shapes may be used for this member when convenient, For example, the member may take the form of an open conduit section, with any solid material being present in the brine exiting the open portion of the conduit section.

Furthermore, while the above description relates to evaporating liquid from brine, including sea, ocean water and brackish water, the present invention is generally applicable to evaporating liquid from other liquids. For example, industrial, domestic and agricultural waste liquids and solutions as well as surplus surface waters may have liquid evaporated from them using the methods and apparatus of the present invention.

Preferably member 58 is constructed from material which exhibits non-corrosive behaviour to the liquids from which the spray shower is produced. Such materials include titanium, plastics and teflon. Also such materials have been found to be particularly suitable in the manufacture of the spray member. This is because this member is preferably manufactured using laser beam welding techniques wherein the holes are produced in the member material by the laser beam. Preferably, 1,500 holes are contained in a member. The relatively low coefficients of heat conduction of the above-mentioned materials facilitate the production of the holes and the use of such materials has been found to drastically cut the cost of production of the spray member to approximately U.S. $3.00 per member as compared to approximately U.S. $90.00 per member when ceramic material is used as the construction material.

Preferably, member 58 has a 1 to 2 mm thickness for plastics and a 0.1 to 0.5 mm thickness for metals such as titanium. The diameter of member 58 is preferably 36 mm, and the holes are contained within a diameter of preferably 30 mm.

Figure 2:
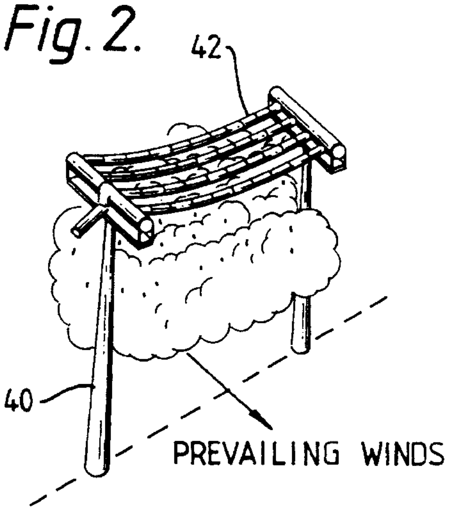
FIG. 2 is a perspective view of another embodiment showing the spraying of liquid into air using a plurality of of shower lines.

The following is an example of specific apparatus according to the present invention for converting dilute Dead Sea water to end brine in the open air under atmospheric conditions at noon time, wherein spray heads including members having holes of about 0.062 mm separated by a distance of about 0.7 mm. These spray heads are connected to 40 meter long conduits strung between towers in a direction perpendicular to the direction of the wind having a horizontal speed of 6.4 m/s in a manner as shown in FIG. 2. Dead Sea water having a density of 1.054 kg/m$^3$ was sprayed into air having a dry bulb temperature of 36° C. and a wet bulb temperature of 22.5° C. (a relative humidity of 28%) at a height of 11 meters. A shower of brine droplets having a radii of 0.1 mm was produced which evaporated 31% of the droplet's water content under conditions of constant enthalpy, the air residence time being approximately 6 seconds and the shower having a brine-air mixing ratio of 0.003 and a time constant of approximately 30 seconds. A final brine density of 1.081 kg/m$^3$ was achieved in the brine catch reservoir. The majority of droplets reached the catch basin at a distance of 40 meters from the spray head lines, with 80% of the droplet mass being collected in the catch basin within a distance of 60 meters from the shower lines. Since the above-mentioned droplet diameter was less than square root of the product of coefficient of salt diffusion, 2×10$^{-9}$m$^3$/s, of the Dead Sea water used and the interaction time of the droplets present in the shower, 6 seconds, it was ensured that all of the liquid contained in the droplets took part in the evaporation process guaranteeing that the required end brine concentration was achieved in the catch reservoir.

In the other form of the invention, apparatus analogous to that shown in FIG. 1, is shown in FIG. 4, reference numeral 60 designating apparatus for cooling a liquid. Water to be cooled is drawn through condenser 62 by pump 70 where it absorbs heat and is supplied through a filter 71 (optional) and piping 66 and 68 to spray heads 72 connected to piping 68 and located at an elevation H above the surface of second reservoir 74 which acts as a catch basin receiving cooled water droplets. Here also, the spray heads are chosen to produce droplets of a predetermined radius in a manner described below, the spray heads being positioned so as to establish a spray shower having a mixing ratio measured in terms of kilograms of liquid per kilogram of air which is less than a predetermined value, also described below. However, in accordance with this aspect of the present invention, spray heads 72 are positioned and operated such that the cooling of the water occurs under the conditions, as explained below, in which the enthalpy of the water and the air in the shower change by a substantially large extent wherein the latent heat flux due to evaporation is large compared with the sensible heat flux supplied by the air bringing about a cooling of the water contained in the droplets. Thus, the cooling of the water is vitally dependent on the extent and manner in which the water makes contact with the gaseous medium, The drag force on the air due to the falling droplets and the decrease in the temperature due to their cooling as well as the increase in the density of the air establishes a downwardly flowing column of air 76 into which surrounding ambient air is entrained. By choosing the appropriate parameters of the system in particular the liquid-air mixing ratio and droplet size, as described below, the desired temperature of the cooling water will be achieved as the droplets enter the catch basin 74. Cooled water 78 contained in basin 74 is drawn by pump 70 through conduit 64 to condenser 62 where it absorbs heat and completes the cycle.

The apparatus shown in FIG. 4 shows the spray heads arranged in order to produce a line shower. However, also in this embodiment, spray heads 72 may be arranged, if preferred, to produce a cylindrical shower. However, normally, a line shower will be preferred when apparatus shown in FIG. 1 is operated in the natural open atmosphere and where the prevailing winds have a preferential direction. In such case, in order to intensify the spray shower produced, several spray lines can be used to advantage in a manner analogous to that shown in FIG. 2 wherein the spray lines are erected in a direction normal to the prevailing wind direction, thus taking advantage of the winds to introduce fresh, dry air into the shower thereby enhancing the cooling process and making the shower more effective.

Conservation of energy considerations show that the enthalpy difference, $\Delta h_a$, between the enthalpy of the air entering a shower, $h_{ai}$ and $h_{ah}$, the enthalpy of the air leaving a shower volume, is given by:

$$\Delta h_a = R\, C_p \Delta T_l \quad (1)$$

where R is the mass flux ratio of liquid to air, $C_p$ is the specific heat of air and $\Delta T_l$ is the cooling range of the liquid and is as follows:

$$\Delta T_l = T_{li} - T_{lf} \quad (2)$$

where $T_{li}$ is the initial temperature of the liquid entering the shower and $T_{lf}$ is the final temperature of the liquid leaving the shower.

Mass flux ratio R is given by:

$$R = F_l / F_a \quad (3)$$

where $F_l$ is the mass flow of the liquid droplets entering the shower and $F_a$ is the mass flow of the air entering the shower and is as follows:

$$F_a=P_a(WA+UHL) \qquad (4)$$

where $P_a$ is the density of the air entering the shower, W is the vertical air velocity, U is the horizontal air or wind velocity, A is the upper horizontal cross-sectional area of the shower, H is the height of the shower and L is the length of the shower normal to the direction of the horizontal wind. Upper horizontal cross-sectional area of the shower A, is as follows:

$$A=(B)\ (L) \qquad (5)$$

where B is the breadth of the shower along the direction of the horizontal wind. Due to the liquid content within the shower, the vertical motion therein is controlled by reduced gravity g' given by:

$$g'=(g)\ (\Delta T_a)/T_a+gm_l \qquad (6)$$

where $\Delta T_a$ is the reduced air temperature in the shower, $T_a$ is the absolute temperature of the ambient air, $m_l$ is liquid-air mixing ratio, kilograms of liquid per kilograms of air and g is the acceleration due to gravity. For cooling showers $m_l >> \Delta T_a/T_a$, vertical air velocity W is as follows:

$$W=(2gm_l(H)^{1/2} \qquad (7)$$

assuming all of the gravity energy is converted to kinetic energy. Thus, equation (7) shows that in a cooling shower, the vertical air velocity is controlled by mixing $m_l$ and shower height H. Normally in practice, some energy is dissipated, and consequently, W can adequately be approximated as follows:

$$W=(gm_lH)^{1/2} \qquad (8)$$

Substituting R from equation (3) and $F_a$ from equation (4) into equation (1) yields the following expression for $F_l$, the mass flow of liquid droplets in the shower:

$$F_l=[(P_a)(\Delta h)/(C_p\Delta T_l)]\ (WA+UHL) \qquad (9)$$

Alternatively, $F_l$ is given by:

$$F_l=P_aA(W+w_d)m_l \qquad (10)$$

where $w_d$ is the drift velocity of the droplets.

In any shower, the rate at which the air temperature changes is related to the temperature of the air and the temperature of the liquid due to the interaction between the droplets and the air as $$dTd/dt=(T_l-T_a)/\tau \qquad (11)$$

where $\tau$ is the time constant of the shower system and represents the time required for air temperature change in the shower to approach the thermal head temperature difference, which is the difference between the ambient air temperature and the temperature of the liquid leaving the shower. Time constant $\tau$ is as follows:

$$\tau=[2p_l)/3P_aNuK](r^2/m_l) \qquad (12)$$

where $P_l$ is the density of the liquid, $P_a$ is the density of the air, Nu is the Nusselt number of the heat transfer between the liquid and the air, being a function of the radius of the droplets and r is the radius of the droplets.

Integrating equation (11) yields the following result:

$$T_{ai}-T_{af}=(T_{ai}-T_{lf})[1-exp(-t/\tau)] \qquad (13)$$

where $T_{ai}$ is the temperature of the air entering the shower $T_{af}$ is the temperature of the air leaving the shower, and $T_{lf}$ is the temperature of the liquid leaving the shower.

Analogously, equation (13) can be written in terms of enthalpy as follows:

$$h_{ai}-h_{af}=(h_{ai}-h_{lf})[1-exp(-t/\tau)] \qquad (14)$$

where $h_{ai}$ is the enthalpy of the air entering the shower and half the enthalpy of the liquid leaving the shower volume.

The residence time for which an air element remains in a shower can be expressed as follows:

$$t_r=V/F_a=HBL/[(P_a)(WBL+UHL)]=(1P_a)(1/[gm_l/H)^{1/2}+(U/H)\ ] \qquad (15)$$

Assuming that the time that the air element is present in the shower volume is sufficient such that its temperature and enthalpy change reaches 1/e of the thermal head yields:

$$t_r=\tau \qquad (16)$$

consequently determining the enthalpy of the air exiting the shower from equation (14) and the droplet radius as follows:

$$r=[(3P_aNuKml)/2p_l]^{1/2}[(gm/H)^{1/2}+\ (U/H]^{1/2} \qquad (17)$$

Equating equations (9) and (10) and introducing W from equation (8), A from equation (5) and designating for convenience $(m_l)^{1/2}$ as X, the following equation is obtained:

$$X^3=[w_d/(gH)^{1/2}]X^2-\Delta ha/(C_p\Delta T(X-[\Delta h_a\ /(C_pT_l)][U/(gH)^{1/2}](H/B)(18)$$

Equation (18) can be solved for X for given values of the coefficients of X which appear in non-dimension form.

Since drift velocity $w_d$ is a function of droplet radius and liquid density and for water is given by:

$$w_d=0.65+(r-100)/120 \qquad (19)$$

it can be seen from the above analysis that the mixing ratio $m_l$ is given by equation (18) for given physical dimensions of the cooling shower H and B, the horizontal wind velocity U and the liquid cooling range $\Delta T_l$ determining the required droplet radius r, droplet drift velocity $w_d$ and required liquid mass flow rate $F_l$ to be used.

Accordingly, the apparatus disclosed ensures that most of the cooling process proceeds under the conditions in which the enthalpy of the water and the air in the shower change to a substantially large extent wherein the latent heat flux due to evaporation is large compared with the sensible heat flux supplied by the air bringing about the cooling of substantially all of the water contained in the droplets while at the same time substantially reducing the drift of the droplets away from reservoir 74 acting as a catch basin for the cooled droplets. This is achieved in the present invention by using spray heads 72 designed and positioned to produce a shower of droplets having uniform or substantially constant radius, the shower possessing a substantially constant liquid-air mixing ratio, $m_l$. The radius of the droplets, r, is selected such that, on the one hand, it is sufficiently small to permit almost all of the droplets to cool and reach the required temperature as they enter the catch basin, thus eliminating the necessity for recycling the water while, on the other hand, being sufficiently large to substantially reduce or eliminate droplet drift away from the catch basin.

Applying the above analysis to the cooling of water having a cooling range of 7° C. for a cooling shower in the open air having a height H, breadth B and length L each of 4 meters, the following results presented in Table 1 below are obtained:

TABLE 1

| X | r mm | $w_d/(gH)^{1/2}$ | $\Delta h/(Cp\Delta T)$ | $U/(gH)^{1/2}$ | H/B | $m_l$ | W m/s | F kg/sm$^2$ | Q kw/m$^2$ |
|---|---|---|---|---|---|---|---|---|---|
| 0.62 | 0.2 | 0.24 | 0.3 | 0.5 | 1 | 0.38 | 3.8 | 2.5 | 60 |
| 0.40 | 0.2 | 0.24 | 0.25 | 0 | 1 | 0.16 | 2.5 | 0.77 | 21 |

where Q is the heat extracted per unit area of the cooling shower. From the above table it can be seen that when using a mixing ratio, $m_l$, of greater than 0.1, a droplet drift velocity, $w_d$, of approximately 1.5 m/s ($w_d/(gH)$ equal to 0.24) will be obtained when using spray heads designed to produce droplets having a uniform or substantially constant radius, r, of 0.2 mm, and consequently the droplet spread will be significantly minimized. Also, this table shows that the presence of a horizontal wind can be used advantageously to permit the droplet water flow rate $F_l$ to be increased, thus increasing the intensity of the shower and bringing about extraction of more heat per unit area.

Thus, by designing the spray head to produce droplets having a uniform or substantially constant radius between 0.2 mm and 0.3 mm, the spray heads being operated and positioned to produce a shower having a liquid-air mixing ratio of greater than 0.1, the droplet drift velocity will be approximately 1.5 m/s and consequently the droplet spread will be significantly minimized while cooling the liquid to the required temperature as the droplets enter the catch basin. A height of at least 4 meters, length of 4 meters normal to the wind direction and breadth of 4 meters are the preferred dimensions of the cooling shower.

In this embodiment of the present invention, spray heads similar to the one shown in FIG. 3 are used. An embodiment of a spray head used in accordance with this aspect of the present invention for cooling water is shown in FIG. 5. Referring now to FIG. 5 spray head 80 comprises connecting member 82 for connecting the spray head to water supply means as shown in FIG. 4. Pipe section 84 contains fastening ring 86 holding flat plate member 88 having a plurality of holes 90 for producing a spray of water droplets of uniform or constant radius which interact with the air in a manner described hereinbefore. Since the radius of the droplets produced is substantially constant, a droplet radius can be selected which, on the one hand is sufficiently small to permit almost all of the droplets to cool sufficiently, reaching the required temperature as they enter the catch basin, and eliminating the necessity of recycling the water while, on the other hand, being sufficiently large to substantially reduce or eliminate droplet drift away from the catch basin as described hereinbefore. By selecting a droplet size which is less than the square root of the product of coefficient of heat diffusion of water, $k_q$ ($2\times10^{-7}m^3/s$) and the interaction time of the water droplets present in the shower, $T_{iq}$, it is ensured that all of the water contained in each droplet takes part in the cooling process eliminating any need for water recycling to reach the required cooling temperature. In addition, the size of the holes 90 is selected such that any solid material present in the water to be cooled will not cause blockage of the spray heads and the distance between the holes is chosen in order to ensure the production of a shower of droplets having substantially uniform or constant size. Preferably, the radius of holes 90 is about 0.1 mm, with the distance between the holes on member 88 being at least 0.3 mm. Preferably, member 88 has 1,500 holes. In such manner, a shower of droplets having a uniform radius of approximately 0.2 mm is produced, the droplets having a settling or drift velocity of approximately 1.5 m/s being sufficient to substantially reduce drift under most ambient conditions. Furthermore, spray head 80 operates at minimal pressures, no greater than 2 atmospheres, and its operating pressure has no influence on the size of the droplets produced by it. Preferably, an operating pressure of 0.2 atmospheres is used. Thus, the pump used to supply water to the spray heads can operate at relatively small pressures and minimize energy consumption. Also, in the present embodiment, flexibility of operation is achieved by using such spray heads since the water flow rate can be changed when necessary, as discussed above, by increasing the spray head operating pressure for example, without altering the basic characteristics of the spray shower, in particular the droplet radius and mixing ratio. For example, if the ambient wind velocity increases large quantities of fresh dry air are made available for the cooling process and consquently the water flow rate can be increased by increasing the spray head operating pressure permitting larger quantities of water to be cooled while at the same time maintaining a constant droplet radius. While the embodiment shown in FIG. 5 shows member 88 as a flat plate of material, other shapes may be used for this member when convenient. For example, the member may take the form of an open conduit section, with any solid material being present in the water exiting the open portion of the conduit section.

While the above description relates to cooling water, the present invention is generally applicable to cooling other liquids. For example, sea and ocean water, brackish water, industrial, domestic and agricultural waste liquids and solutions as well as surplus surface waters may be cooled using the methods and apparatus of the present invention, Preferably, member 88 is constructed from material which exhibits non-corrosive behaviour to the liquids from which the spray shower is produced, Such materials include titanium, plastics and teflon. Also such materials have been found to be particularly suitable in the manufacture of the spray member, This is because this member is preferably manufactured using laser beam welding techniques wherein the holes are produced in the member material by the laser beam, The relatively low coefficients of heat conduction of the above mentioned materials facilitate the production of the holes also drastically cutting the cost of production of the spray member to approximately U.S. $3.00 per member as compared to approximately U.S. $90.00 per member when ceramic material is used as the construction material.

Preferably, member 88 has a 1 to 2 mm thickness for plastics and a 0.1 to 0.5 mm thickness for metals such as titanium. The diameter of member 88 is preferably 36 mm, and the holes are contained within a diameter of preferably 30 mm.

It is believed that the advantage and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method for evaporating a starting solution to produce an end solution by spraying said starting solution into a gaseous medium under the conditions that the heat content of the starting solution in contact with the gaseous medium is smaller than the heat content of the gaseous medium; the duration of contact is such that most of the evaporation of solution takes place under conditions of constant enthalpy; and the vapor pressure of the gaseous medium is less than the vapor pressure of the liquid/gas interface of the end solution comprising the step of: spraying the starting solution supplied by delivering means using a pump through spray heads, each spray head comprising a stationary member having a plurality of holes the radii of which are not less than 0.025 mm and the distance between them being at least 0.3 mm for producing a shower of starting solution droplets of substantially constant radius substantially independent of spray head operating pressure.

2. A method according to claim 1 wherein said pump connected to starting solution delivering means operates at a working pressure such that the operating pressure of the spray heads is less than three atmospheres.

3. A method according to claim 2 wherein the mass mixing ratio of the starting solution to the gaseous medium within almost all of the droplet shower is substantially constant and less than about 0.02 and the radius of the droplets is less $[k_s)(t_i)]^{1/2}$ where $k_s$ is the coefficient of salt diffusion of the starting solution and $t_i$ is the interaction time of the droplets within the droplet shower.

4. A method according to claim 3 wherein the radius of the droplets is less than about 0.2 mm.

5. A method according to claim 4 wherein the starting solution is an aqueous solution and the gaseous medium is air.

6. A method according to claim 5 wherein the starting solution is brine.

7. A method according to claim 5 wherein the starting solution is agricultural waste liquid.

8. A method according to claim 5 wherein the starting solution is industrial waste liquid.

9. A method according to claim 8 including carrying out the method in the open air.

10. A method according to claim 9 wherein said spray head member is a substantially flat plate of plastic.

11. A method according to claim 10 wherein said spray head member is a substantially flat plate of teflon.

12. A method according to claim 9 wherein said spray head member as a substantially flat plate of titanium.

13. A method according to claim 9 wherein said spray head member is a conduit section of plastic.

14. A method according to claim 9 wherein said spray head member is a conduit section of teflon.

15. A method according to claim 9 wherein said spray head member is a conduit section of titanium.

16. A method for cooling a liquid by spraying said liquid into a gaseous medium under the conditions that the heat content of the liquid is larger than the heat content of the gaseous medium; and the mixing ratio m of the liquid to gas is greater than 0.1 comprising the step of: spraying the liquid supplied by delivering means using a pump through spray heads, each spray head comprising a stationary member having a plurality of holes the radii of which are not less than 0.1 mm and the distance between them being at least 0.3 mm for producing a shower of liquid droplets of substantially constant radius substantially independent of spray head operating pressure.

17. A method according to claim 16 wherein said pump connected to liquid delivering means operates at a working pressure such that the operating pressure of the spray heads is less than two atmospheres.

18. A method according to claim 17 wherein the mass mixing ratio of the liquid to the gaseous medium within substantially all of the droplet shower is substantially constant and the radius of the droplets is less $[(k_q)\ (t_i)]^{1/2}$ wherein $k_q$ is the coefficient of heat diffusion in the liquid and $t_i$ is the interaction time of the droplets within the droplet shower.

19. A method according to claim 18 wherein the liquid is water and the gaseous medium is air.

20. A method according to claim 18 wherein the liquid is an aqueous solution and the gaseous medium is air.

* * * * *